US012591752B2

(12) United States Patent
Hyland et al.

(10) Patent No.: US 12,591,752 B2
(45) Date of Patent: Mar. 31, 2026

(54) ZERO-SHOT DOMAIN TRANSFER WITH A TEXT-TO-TEXT MODEL

(71) Applicant: Microsoft Technology Licensing, LLC, Redmond, WA (US)

(72) Inventors: Stephanie Hyland, Harston (GB); Aditya Nori, Cambridge (GB); Fangyu Liu, Cambridge (GB); Fernando Perez Garcia, London (GB); Qianchu Liu, Cambridge (GB); Hoifung Poon, Bellevue, WA (US); Javier Alvarez-Valle, Cambridge (GB); Naoto Usuyama, Sammamish, WA (US); Ozan Oktay, London (GB); Sheng Zhang, Issaquah, WA (US); Shruthi Jaisimha Bannur, Cambridge (GB); Tristan Josef Naumann, Seattle, WA (US)

(73) Assignee: Microsoft Technology Licensing, LLC., Redmond, WA (US)

( * ) Notice: Subject to any disclaimer, the term of this patent is extended or adjusted under 35 U.S.C. 154(b) by 457 days.

(21) Appl. No.: 18/161,033

(22) Filed: Jan. 27, 2023

(65) Prior Publication Data

US 2024/0256796 A1 Aug. 1, 2024

(51) Int. Cl.
| | |
|---|---|
| *G06F 40/56* | (2020.01) |
| *G06F 40/284* | (2020.01) |
| *G06F 40/30* | (2020.01) |

(52) U.S. Cl.
CPC ............ G06F 40/56 (2020.01); G06F 40/284 (2020.01); G06F 40/30 (2020.01)

(58) Field of Classification Search
CPC ......... G06F 40/56; G06F 40/284; G06F 40/30
See application file for complete search history.

(56) References Cited

U.S. PATENT DOCUMENTS

| | | | |
|---|---|---|---|
| 2020/0334416 A1 | 10/2020 | Vianu et al. | |
| 2021/0264208 A1* | 8/2021 | Damodaran | G06N 5/02 |
| 2022/0075945 A1* | 3/2022 | Zhang | G06F 40/205 |

FOREIGN PATENT DOCUMENTS

CN 113408284 A 9/2021

OTHER PUBLICATIONS

Raffel et. al, "Exploring the Limits of Transfer Learning with a Unified Text-to-Text Transformer", 2020.*

(Continued)

*Primary Examiner* — Richemond Dorvil
*Assistant Examiner* — Adam Michael Weaver
(74) *Attorney, Agent, or Firm* — Barta Jones, PLLC

(57) ABSTRACT

Example solutions for zero-shot domain transfer with a text-to-text model train a text-to-text model for a target domain using unlabeled in-domain text training data, and concurrently train the model using labeled general-domain task training data. The in-domain training comprises masked language modeling (MLM) training, and the task training comprises both natural language generation (NLG) training and natural language understanding (NLU) training. The NLG training comprises natural language inference (NLI) training and the NLU training comprises summarization training. The trained model acquires domain-specific task competency, sufficient to perform a language task within the target domain. Suitable target domains include radiology, biomedical, and other medical, legal, and scientific domains. This approach leverages large volumes of general-domain task training data and plentiful unlabeled in-domain text, even as labeled in-domain training data may be unavailable or prohibitively expensive for certain specialized domains.

20 Claims, 6 Drawing Sheets

(56) References Cited

OTHER PUBLICATIONS

Wei et. al., "Finetuned Language Models are Zero-Shot Learners", 2022.*

Meng et. al., "Generating Training Data with Language Models: Towards Zero-Shot Language Understanding", 2022.*

Bonifacio et. al., "InPars: Unsupervised Dataset Generation for Information Retreival", 2022.*

Raffel et. al., "Exploring the Limits of Transfer Learning with a Unified Text-to-Text Transformer", Jun. 20, 2020 (Year: 2020).*

Wei et. al., "Finetuned Language Models are Zero-Shot Learners", Feb. 8, 2022 (Year: 2022).*

"Index of /pubmed/baseline", Retrieved From: https://ftp.ncbi.nlm.nih.gov/pubmed/baseline, Retrieved From: Jul. 26, 2022, 34 Pages.

"Index of /pubmed/updatefiles", Retrieved From: https://ftp.ncbi.nlm.nih.gov/pubmed/updatefiles/, Retrieved From: Jul. 26, 2022, 1 Page.

"Transactions of the Association for Computational Linguistics", Retrieved From: https://transacl.org/index.php/tacl, Retrieved From: Aug. 9, 2022, 4 Pages.

Alambo, et al., "Entity-driven Fact-aware Abstractive Summarization of Biomedical Literature", In repository of arXiv:2203.15959v1, Mar. 30, 2022, 8 Pages.

Aribandi, et al., "Ext5: Towards Extreme Multi-Task Scaling for Transfer Learning", In Proceedings of the International Conference on Learning Representations., Apr. 25, 2022, 26 Pages.

Beltagy, et al., "SciBERT: A Pretrained Language Model for Scientific Text", In Proceedings of the Conference on Empirical Methods in Natural Language, Nov. 3, 2019, pp. 3615-3620.

Boecking, et al., "Making the Most of Text Semantics to Improve Biomedical Vision-Language Processing", In repository of arXiv:2204.09817v4, Jul. 21, 2022, 36 Pages.

Bowman, et al., "A large annotated corpus for learning natural language inference", In Proceedings of the Conference on Empirical Methods in Natural Language Processing, Sep. 17, 2015, pp. 632-642.

Brown, et al., "Language Models Are Few-Shot Learners", In Proceedings of Advances in Neural Information Processing Systems, Dec. 6, 2020, 25 Pages.

Conneau, et al., "Unsupervised Cross-lingual Representation Learning at Scale", In Proceedings of the 58th Annual Meeting of the Association for Computational Linguistics, Jul. 5, 2020, pp. 8440-8451.

Conneau, et al., "XNLI: Evaluating Cross-lingual Sentence Representations", In Proceedings of the Conference on Empirical Methods in Natural Language Processing, Oct. 31, 2018, pp. 2475-2485.

Fushman, et al., "Preparing a Collection of Radiology Examinations for Distribution and Retrieval", In Journal of the American Medical Informatics Association, vol. 23, Issue 2, Mar. 1, 2016, pp. 304-310.

Graff, et al., "English Gigaword", In Journal of Linguistic Data Consortium, vol. 4, Issue 1, Jan. 28, 2003, 2 Pages.

Gu, et al., "Domain-Specific Language Model Pretraining for Biomedical Natural Language Processing", In Journal of ACM Transactions on Computing for Healthcare, vol. 3, Issue 1, Oct. 15, 2021, 23 Pages.

Johnson, et al., "MIMIC-CXR Database", In Journal of PhysioNet10, vol. 13026, Sep. 19, 2019, 9 Pages.

Korotkov, et al., "Zero-shot Neural Passage Retrieval via Domain-targeted Synthetic Question Generation", In Proceedings of the 16th Conference of the European Chapter of the Association for Computational Linguistics, Apr. 19, 2021, pp. 1075-1088.

Lee, et al., "Biobert: A Pre-Trained Biomedical Language Representation Model for Biomedical Text Mining", In Journal of Bioinformatics, vol. 36, Issue 4, Sep. 10, 2019, pp. 1234-1240.

Liu, et al., "RoBERTa: A Robustly Optimized BERT Pretraining Approach", In repository of arXiv:1907.11692v1, Jul. 26, 2019, 13 Pages.

Min, et al., "MetaICL: Learning to Learn in Context", In Proceedings of the Conference of the North American Chapter of the Association for Computational Linguistics: Human Language Technologies, Jul. 10, 2022, pp. 2791-2809.

Miura, et al., "Improving Factual Completeness and Consistency of Image-to-Text Radiology Report Generation", In Proceedings of the Conference of the North American Chapter of the Association for Computational Linguistics: Human Language Technologies, Jun. 6, 2021, pp. 5288-5304.

Musgrave, et al., "Losses-PyTorch Metric Learning", Retrieved From: https://kevinmusgrave.github.io/pytorch-metric-learning/losses/#ntxentloss, Retrieved From: Jul. 26, 2022, 30 Pages.

Musgrave, et al., "PyTorch Metric Learning", In repository of arXiv:2008.09164v1, Aug. 20, 2020, 7 Pages.

Nie, et al., "Adversarial NLI: A New Benchmark for Natural Language Understanding", In Proceedings of the 58th Annual Meeting of the Association for Computational Linguistics, Jul. 5, 2020, pp. 4885-4901.

Oord, et al., "Representation Learning with Contrastive Predictive Coding", In repository of arXiv:1807.03748v1, Jul. 10, 2018, 13 Pages.

Peng, et al., "Transfer Learning in Biomedical Natural Language Processing: An Evaluation of BERT and ELMo on Ten Benchmarking Datasets", In Proceedings of the 18th BioNLP Workshop and Shared Task, Aug. 1, 2019, pp. 58-65.

Phan, et al., "Scifive: A Text-To-Text Transformer Model for Biomedical Literature", In repository of arXiv:2106.03598v1, May 28, 2021, 7 Pages.

Raffel, et al., "Exploring the Limits of Transfer Learning with a Unified Text-to-Text Transformer", In Journal of Machine Learning Research, vol. 21, Issue 140, Jun. 20, 2020, pp. 1-67.

Rajagopal, et al., "Counterfactual Data Augmentation improves Factuality of Abstractive Summarization", In repository of arXiv:2205.12416v1, May 25, 2022, 6 Pages.

Romanov, et al., "Lessons from Natural Language Inference in the Clinical Domain", In Proceedings of the Conference on Empirical Methods in Natural Language Processing, Oct. 31, 2018, pp. 1586-1596.

Rush, et al., "A Neural Attention Model for Abstractive Sentence Summarization", In Proceedings of the Conference on Empirical Methods in Natural Language Processing, Sep. 17, 2015, pp. 379-389.

Sanh, et al., "Multitask Prompted Training Enables Zero-Shot Task Generalization", In Proceedings of International Conference on Learning Representations, Apr. 25, 2022, 216 Pages.

Shazeer, et al., "Adafactor: Adaptive Learning Rates with Sublinear Memory Cost", In Proceedings of International Conference on Machine Learning, PMLR, Jul. 10, 2018, 9 Pages.

Smit, et al., "Combining Automatic Labelers and Expert Annotations for Accurate Radiology Report Labeling Using BERT", In Proceedings of the Conference on Empirical Methods in Natural Language Processing (EMNLP), Nov. 16, 2020, pp. 1500-1519.

Titipata, et al., "Pubmed Parser: A Python Parser for PubMed Open-Access XML Subset and Medline XML Dataset", Retrieved From: https://github.com/titipata/pubmed_parser, Nov. 19, 2021, 9 Pages.

Wang, et al., "GPL: Generative Pseudo Labeling for Unsupervised Domain Adaptation of Dense Retrieval", In Proceedings of the Conference of the North American Chapter of the Association for Computational Linguistics: Human Language Technologies, Jul. 10, 2022, pp. 2345-2360.

Wang, et al., "Medsts: A Resource for Clinical Semantic Textual Similarity", In Journal of Language Resources and Evaluation, vol. 54, Issue 1, Oct. 24, 2018, pp. 57-72.

Wei, et al., "Finetuned Language Models are Zero-Shot Learners", In Proceedings of International Conference on Learning Representations, Apr. 25, 2022, 46 Pages.

Williams, et al., "A Broad-Coverage Challenge Corpus for Sentence Understanding through Inference", In Proceedings of the Conference of the North American Chapter of the Association for Computational Linguistics: Human Language Technologies, vol. 1, Jun. 1, 2018, pp. 1112-1122.

Reimers Nils, "Train the Best Sentence Embedding Model Ever with 1B Training Pairs", Retrieved from: https://discuss.huggingface.

(56) References Cited

OTHER PUBLICATIONS co/t/train-the-best-sentence-embedding-model-ever-with-1b-training-pairs/7354/1, Jun. 25, 2021, 15 Pages.

International Preliminary Report on Patentability (Chapter I) received for PCT Application No. PCT/US2023/085604, mailed on Aug. 7, 2025, 10 pages.

International Search Report and Written Opinion received for PCT Application No. PCT/US2023/085604, Apr. 19, 2024, 16 pages.

Muller, et al., "Joint learning of localized representations from medical images and reports", European Conference on Computer Vision, Dec. 6, 2021, 24 Pages.

Various: "Transformer (machine learning model)"—Wikipedia, Retrieved from URL: https://en.wikipedia.org/w/index.php?title=Transformer_(machine_learning_model)&oldid=1033704545, Mar. 30, 2022, 8 Pages.

* cited by examiner

FIG. 2

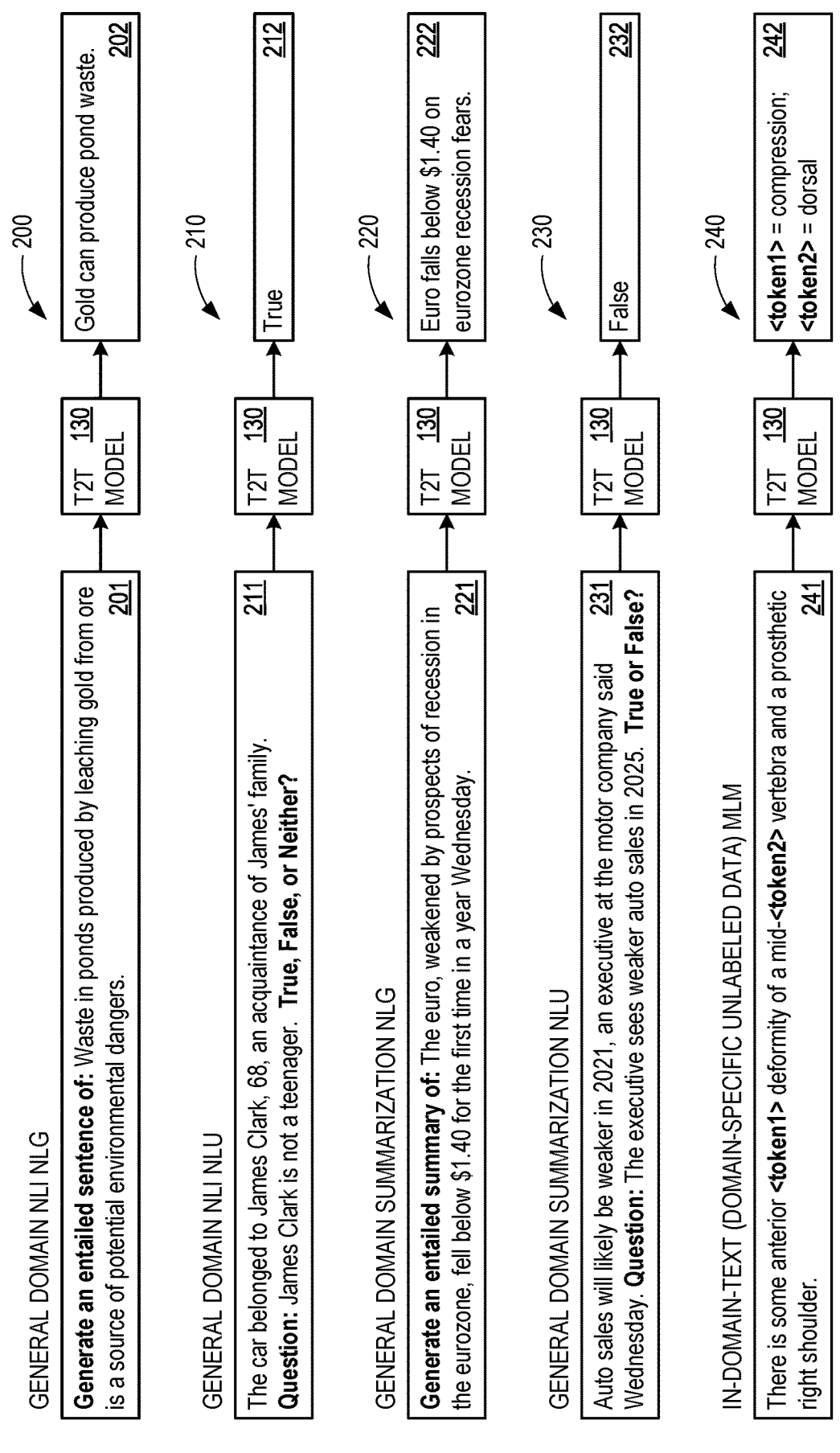

GENERAL DOMAIN NLI NLG

Generate an entailed sentence of: Waste in ponds produced by leaching gold from ore is a source of potential environmental dangers.  201

→ T2T MODEL 130 →

Gold can produce pond waste.  202

200

GENERAL DOMAIN NLI NLU

The car belonged to James Clark, 68, an acquaintance of James' family. Question: James Clark is not a teenager. True, False, or Neither?  211

→ T2T MODEL 130 →

True  212

210

GENERAL DOMAIN SUMMARIZATION NLG

Generate an entailed summary of: The euro, weakened by prospects of recession in the eurozone, fell below $1.40 for the first time in a year Wednesday.  221

→ T2T MODEL 130 →

Euro falls below $1.40 on eurozone recession fears.  222

220

GENERAL DOMAIN SUMMARIZATION NLU

Auto sales will likely be weaker in 2021, an executive at the motor company said Wednesday. Question: The executive sees weaker auto sales in 2025. True or False?  231

→ T2T MODEL 130 →

False  232

230

IN-DOMAIN-TEXT (DOMAIN-SPECIFIC UNLABELED DATA) MLM

There is some anterior <token1> deformity of a mid-<token2> vertebra and a prosthetic right shoulder.  241

→ T2T MODEL 130 →

<token1> = compression;
<token2> = dorsal  242

240

SETTING | INPUT | INPUT | OUTPUT

300

NLI NLG: (x1, y) → x2    301

Generate a {label} sentence of: {premise}    302

{hypothesis}    303

310

NLI NLU: (x1, x2) → y    311

{premise} Question: {hypothesis} True, False or Neither?    312

{True | False | Neither}    313

320

Summarization NLG: (x1, y) → x2    321

Generate a {label} summary of: {document}    322

{summary}    323

330

Summarization NLU: (x1, x2) → y    331

{document} Question: {summary} True or False?    332

{True | False}    333

FIG. 5

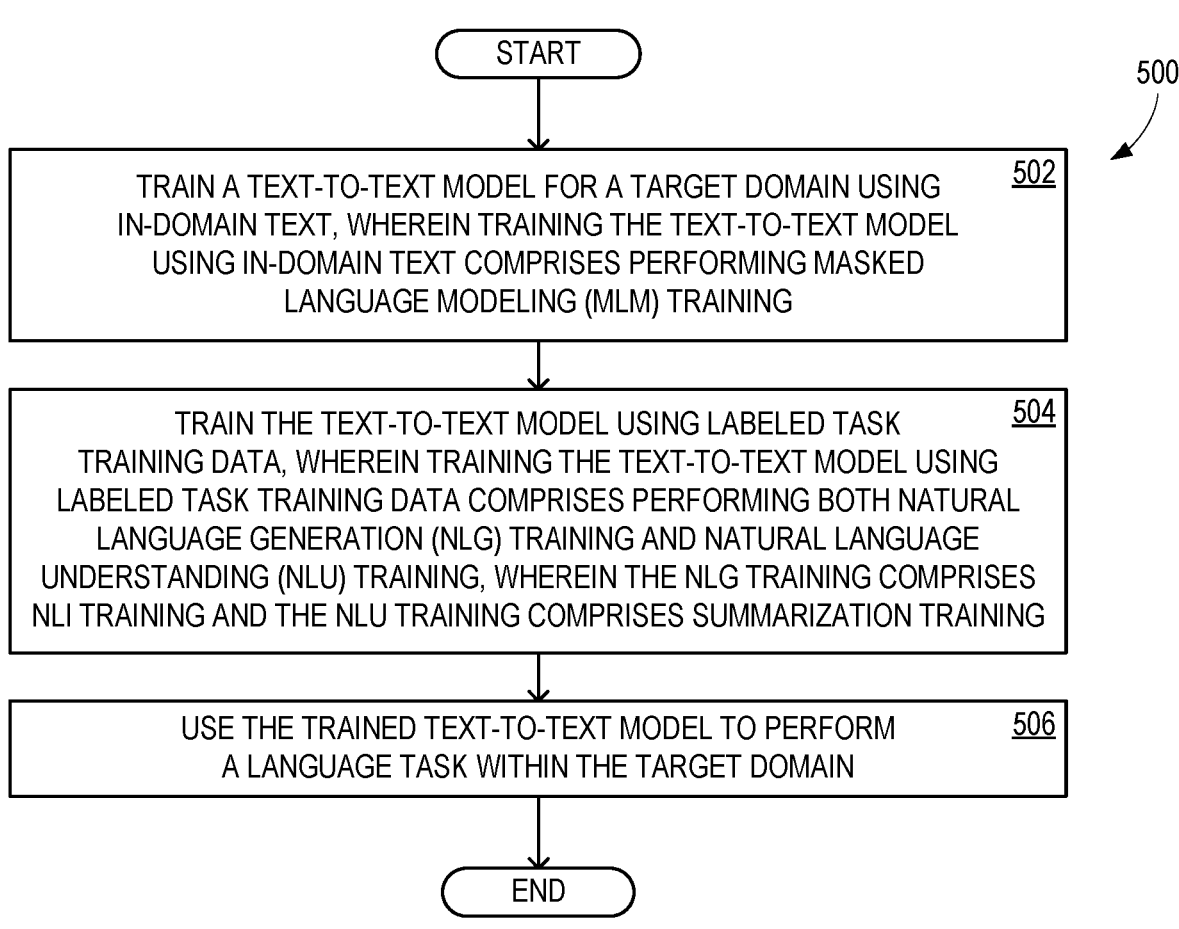

START

500

TRAIN A TEXT-TO-TEXT MODEL FOR A TARGET DOMAIN USING IN-DOMAIN TEXT, WHEREIN TRAINING THE TEXT-TO-TEXT MODEL USING IN-DOMAIN TEXT COMPRISES PERFORMING MASKED LANGUAGE MODELING (MLM) TRAINING      502

TRAIN THE TEXT-TO-TEXT MODEL USING LABELED TASK TRAINING DATA, WHEREIN TRAINING THE TEXT-TO-TEXT MODEL USING LABELED TASK TRAINING DATA COMPRISES PERFORMING BOTH NATURAL LANGUAGE GENERATION (NLG) TRAINING AND NATURAL LANGUAGE UNDERSTANDING (NLU) TRAINING, WHEREIN THE NLG TRAINING COMPRISES NLI TRAINING AND THE NLU TRAINING COMPRISES SUMMARIZATION TRAINING      504

USE THE TRAINED TEXT-TO-TEXT MODEL TO PERFORM A LANGUAGE TASK WITHIN THE TARGET DOMAIN      506

END

Figure 6:
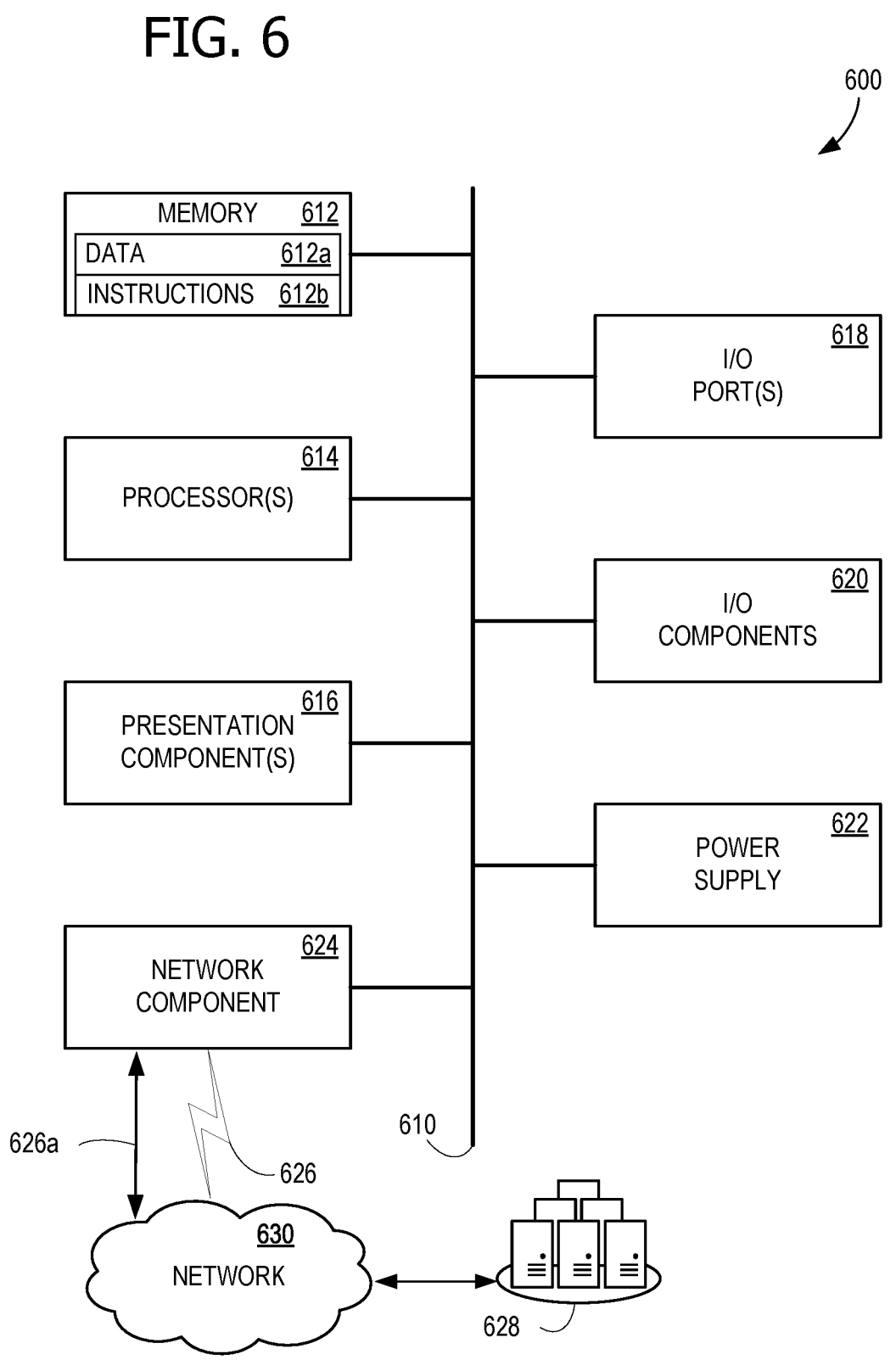

| MEMORY | 612 |
|--------|-----|
| DATA | 612a |
| INSTRUCTIONS | 612b |

PROCESSOR(S) 614

PRESENTATION COMPONENT(S) 616

NETWORK COMPONENT 624

I/O PORT(S) 618

I/O COMPONENTS 620

POWER SUPPLY 622

626a

626

610

630 NETWORK

628

ZERO-SHOT DOMAIN TRANSFER WITH A TEXT-TO-TEXT MODEL

BACKGROUND

While pre-trained language models demonstrate improvements on a wide range of natural language processing (NLP) tasks, it remains challenging to apply them to specialized domains as in-domain task labels are often scarce. To acquire domain-specific task knowledge, a conventional approach is to perform domain-specific pre-training, typically masked language modelling (MLM) on in-domain raw text, followed by fine-tuning with in-domain task-annotated data. Unfortunately, in-domain task labels are often expensive to acquire.

Another approach is to train a model with available general-domain task labels and directly transfer to the new domain. However, the transfer performance is often limited due to the domain gap.

SUMMARY

The disclosed examples are described in detail below with reference to the accompanying drawing figures listed below. The following summary is provided to illustrate some examples disclosed herein. This Summary is not intended to identify key features or essential features of the claimed subject matter, nor is it intended to be used as an aid in determining the scope of the claimed subject matter.

Example solutions for zero-shot domain transfer with a text-to-text model include: training a text-to-text model for a target domain using in-domain text, wherein training the model using in-domain text comprises performing masked language modeling (MLM) training; further training the model using labeled task training data, wherein training the model using labeled task training data comprises performing natural language generation (NLG) training and natural language understanding (NLU) training, wherein the NLG training comprises NLI training and the NLU training comprises summarization training; and using the trained model to perform a language task within the target domain.

In an example, both NLU training and NLG training are performed for both NLI and summarization tasks. While NLI is an NLU task by default, it is converted into an NLG task to enable training both NLU and NLG simultaneously. Similarly, while summarization is an NLG task by default, an NLU variant of it is created.

BRIEF DESCRIPTION OF THE DRAWINGS

The disclosed examples are described in detail below with reference to the accompanying drawing figures listed below:

FIG. 2 illustrates various example natural language tasks on which the text-to-text model of example architectures, such as that of FIG. 1, may be trained;

FIG. 5 shows another flowchart illustrating exemplary operations that may be performed when using example architectures, such as that of FIG. 1; and FIG. 6 shows a block diagram of an example computing device suitable for implementing some of the various examples disclosed herein.

Corresponding reference characters indicate corresponding parts throughout the drawings. Any of the drawings may be combined into a single embodiment or example.

DETAILED DESCRIPTION

Figure 1:
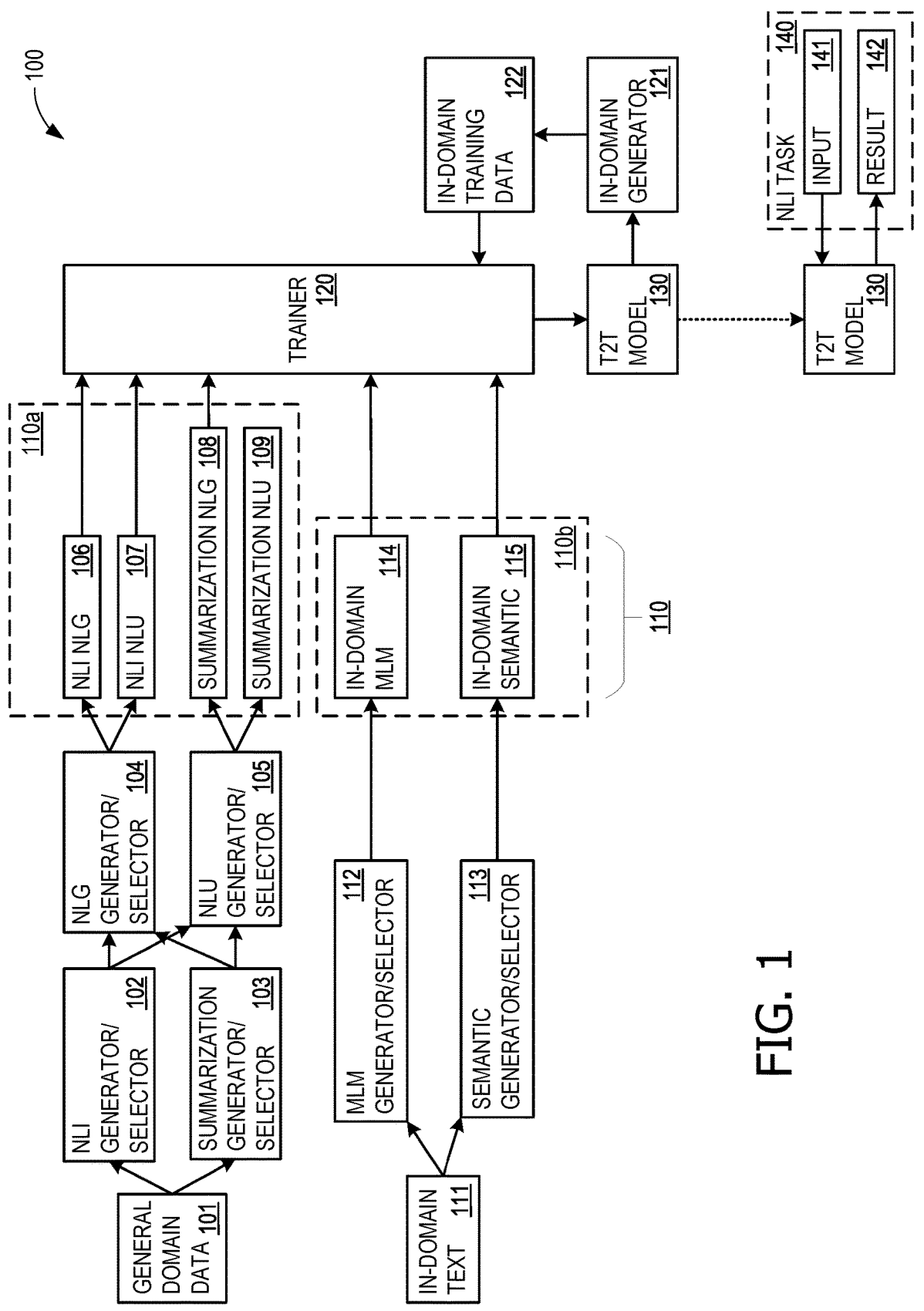
FIG. 1 illustrates an example architecture that advantageously provides for zero-shot domain transfer with a text-to-text model.

The various examples will be described in detail with reference to the accompanying drawings. Wherever preferable, the same reference numbers will be used throughout the drawings to refer to the same or like parts. References made throughout this disclosure relating to specific examples and implementations are provided solely for illustrative purposes but, unless indicated to the contrary, are not meant to limit all examples.

Label scarcity is a bottleneck for improving task performance in specialized domains, such as medical, radiology, biomedical, law, finance, mathematics, chemistry physics, engineering, customer support, and others. A novel compositional transfer learning framework for zero-shot domain transfer is disclosed. The term zero-shot is used herein to mean that labels from the target domain (the specialized domain of interest) are not supplied for training the text-to-text model—although in-domain labels are generated by the text-to-text model for later self-fine tuning, in some examples.

Rather than requiring in-domain labels, the text-to-text model learns domain knowledge from unlabeled in-domain free text, while transferable task knowledge is learned from more readily-available, general-domain, task-specific labels. By integrating the two knowledge sources, the text-to-text model acquires domain-specific task competency. Examples continually pre-train a text-to-text model with masked language modelling (MLM) on in-domain text while simultaneously training on general-domain task labels.

To improve the transferability of task training, a novel multitasking strategy is disclosed that simultaneously trains with natural language generation (NLG) for label-to-data generation and natural language understanding (NLU) for label prediction (the combination of training being labeled "NLGU"). This leverages abundant labeled general domain data (e.g., from the internet) and renders it useful for highly-specialized domain-specific use cases (e.g., biomedicine, radiology). Some domains are relatively data-scarce, such as healthcare fields, due to privacy concerns and expense.

Example solutions for zero-shot domain transfer with a text-to-text model train a text-to-text model for a target domain using unlabeled in-domain text training data and concurrently train the model using labeled general-domain task training data. The in-domain training comprises MLM training and the task training comprises both NLG training and NLU training. The trained model acquires domain-specific task competency, sufficient to perform natural language inference (NLI) and summarization tasks within the target domain. Suitable target domains include radiology, biomedical, and other medical, legal, and scientific domains. This approach leverages large volumes general-domain task training data and plentiful unlabeled in-domain text, even as labeled in-domain training data may be unavailable or prohibitively expensive for certain specialized domains.

Aspects of the disclosure benefit the operations of computing devices, for example, by producing trained machine learning (ML) products (the text-to-text model) with a reduced input (training data without labels from the target domain) in a technically efficient manner. Further, aspects of the disclosure improve the operations of computing devices, for example, improving the computing efficiency of ML models by achieving zero-shot domain transfer of a text-to-text model. This is accomplished, at least in part, by training a text-to-text model for a target domain using in-domain MLM training while further training the model using labeled task training data, such as both NLG and NLU training.

Examples are applied to the specialized biomedicine domain and the resource-lean subdomain of radiology, focusing on NLI, text summarization and embedding learning, to demonstrate the effectiveness of compositional transfer learning. Examples achieve strong zero-shot transfer performance on NLI, outperforming current state-of-the-art (SOTA) baselines by significant margins, such as by gaining over 15 absolute points in accuracy on both radiology NLI (RadNLI) and medical (MedNLI), validating that the trained text-to-text model acquires domain-specific task knowledge through compositional transfer. Ablation studies verify the contributions of the various components in the disclosed framework.

FIG. 1 illustrates an example architecture 100 that advantageously provides for zero-shot domain transfer with a text-to-text model 130. Text-to-text model 130 is to be trained using general domain data 101 and in-domain text 111, and is able to accept training by both labeled and unlabeled data. In some examples, text-to-text model 130 comprises a text-to-text transfer transformer (T5) model. Specialized domains that may benefit from the disclosure include medical, radiology, biomedical, law, finance, mathematics, chemistry physics, engineering, customer support, and others.

An NLI generator/selector 102 either selects existing labeled NLI training data or generates labeled NLI training data from labeled data within general domain data 101. Similarly, a summarization generator/selector 103 either selects existing labeled summarization training data or generates labeled summarization training data from labeled data within general domain data 101. An NLG generator/selector 104 either selects or further generates labeled NLI NLG training data 106 from the output of NLI generator/selector 102, and also either selects or further generates labeled NLI NLU training data 107 from the output of summarization generator/selector 103. Similarly, an NLU generator/selector 105 either selects or further generates labeled summarization NLG training data 108 from the output of NLI generator/selector 102, and also either selects or further generates labeled summarization NLU training data 109 from the output of summarization generator/selector 103. In some examples, the order of NLI and summarization selection/generation versus NLG and NLU selection/generation is reversed, or performed simultaneously (e.g., four separate processes, rather than two stages of two processes each).

An MLM generator/selector 112 either selects existing or generates new in-domain MLM training data 114 from unlabeled data within in-domain text 111. A semantics data generator/selector 113 either selects existing or generates new in-domain semantics data 115, such as synonym pairs, from unlabeled data within in-domain text 111. The set of labeled NLI NLG training data 106, labeled NLI NLU training data 107, labeled summarization NLG training data 108, labeled summarization NLU training data 109, in-domain MLM training data 114, and in-domain semantics data 115 comprises training data 110 that is available for a trainer 120 to perform training on text-to-text model 130 (T2T model 130).

Training data 110 includes labeled task training data 110a and unlabeled in-domain training data 110b. Labeled task training data 110a includes labeled NLI NLG training data 106, labeled NLI NLU training data 107, labeled summarization NLG training data 108, and labeled summarization NLU training data 109. Unlabeled in-domain training data 110b includes in-domain MLM training data 114 and in-domain semantics data 115. To alleviate privacy concerns, general domain data 101 and in-domain text 111 are selected from data that is properly sanitized.

Trainer 120 trains text-to-text model 130 training data 110 to an initial level of performance, which may be referred to as pre-training. MLM is used for learning text representations. In MLM training, text-to-text model 130 predicts a random sample of input tokens that have been replaced by a <token> placeholder in a multi-class setting over a vocabulary. NLG produces natural language output text. NLU attempts to produce a comprehension of human language, so that a computer understands commands without the formalized syntax of computer languages. For example, NLU is able to provide a yes, no or other classification result. NLI is the task of determining whether a given hypothesis logically follows from a provided premise.

After initial training, text-to-text model 130 is able to generate its own in-domain NLI training data 122, under the direction of an in-domain NLI training generator 121. An example is in-domain NLI training generator 121 instructing text-to-text model 130: "Generate an entailed sentence of: Patient has severe pneumonia", and text-to-text model 130 outputting entailment: "Patient is severely ill" as a training pair. Trainer 120 uses in-domain NLI training data 122 to perform further training of text-to-text model 130. Because text-to-text model 130 generated its own training data, this phase of training is self-fine tuning. In some examples, initial training and self-fine tuning occur in a cloud setting or other high performance computing setting.

After text-to-text model 130 is sufficiently trained, and is ready for deployment as a zero-shot domain transfer (domain transfer with no access to labelled in-domain data). Deployment may be on a smaller, less powerful computing resource, in some examples. Text-to-text model 130 takes on different sizes, in different examples, some of which require more computing power and memory. In general, larger versions of text-to-text model 130 that require more memory have superior performance.

Text-to-text model 130 is used to perform a language task 140 (NLI, summarization, or other language or text-based ML task). An input 141 is provided to text-to-text model 130, which produces an output 142. In some examples, input 141 is a document and output 142 is a summary of the document. Various examples of language task 140 include NLI, summarization, data augmentation, generating target domain training data for another ML model (other than text-to-text model 130), document retrieval, classification, determining text similarity, and synthetic data generation. When applied to the medical domain, for example, an example of language task 140 is text-to-text model 130 is able to generate an impression summary or generate a title for a passage of text.

Text-to-text model 130 combines domain knowledge and task knowledge by making use of in-domain free text and general-domain task labels, which are typically accessible and abundant. For example, in the context of NLI, text-to-text model 130 learns domain-specific semantics (e.g., "bony abnormalities" is a synonym of "osseous abnormalities") from in-domain free text and transferable task knowledge from the general-domain task labels (e.g., negation indicates contradiction) to infer domain-specific task knowledge (e.g., "There are no bony abnormalities" contradicts "There are osseous abnormalities").

Text-to-text model 130 is applied to NLI, summarization and text embedding learning, which are fundamental applications across many domains, including the highly specialized domain of biomedicine and its resource-limited subdomain of radiology. Due to their specialization, obtaining labelled data in these domains is expensive and time-consuming. For example, a commonly used radiology-specific NLI dataset contains fewer than 1000 manually labelled examples as test data, and no training data is available.

The key to compositional transfer is continual pre-training to simultaneously acquire domain and task knowledge: jointly training text-to-text model 130 with MLM on in-domain unlabeled data and general domain tasks (NLI and summarization). To better acquire the transferable task knowledge from the general-domain task labels, a multitask setup, NLGU, is introduced, as is shown in FIG. 2.

FIG. 2 illustrates various example natural language tasks on which text-to-text model 130 is trained. For task training, both NLG and NLU variants of NLI and summarization are used, and training is performed simultaneously, in some examples. This exploits the unified sequence-to-sequence framework of some examples of text-to-text model 130, such as some examples in which text-to-text model 130 may be a T5 model.

A general domain NLI NLG training case 200 has an input 201 of "Generate an entailed sentence of: Waste in ponds produced by leaching gold from ore is a source of potential environmental dangers." A target output 202 is "Gold can produce pond waste." A general domain NLI NLU training case 210 has an input 211 of "The car belonged to James Clark, 68, an acquaintance of James' family. Question: James Clark is not a teenager. True, False, or Neither?" A target output 212 is "True."

A general domain summarization NLG training case 220 has an input 221 of "Generate an entailed summary of: The euro, weakened by prospects of recession in the eurozone, fell below $1.40 for the first time in a year Wednesday." A target output 222 is "Euro falls below $1.40 on eurozone recession fears." A general domain summarization NLU training case 230 has an input 231 of "Auto sales will likely be weaker in 2021, an executive at the motor company said Wednesday. Question: The executive sees weaker auto sales in 2025. True or False?" A target output 232 is "False."

A domain-specific unlabeled data MLM training case 240 has an input 241 of "There is some anterior <token1> deformity of a mid-<token2> vertebra and a prosthetic right shoulder." A target output 242 is "<token1>=compression; <token2>=dorsal."

Figure 3:
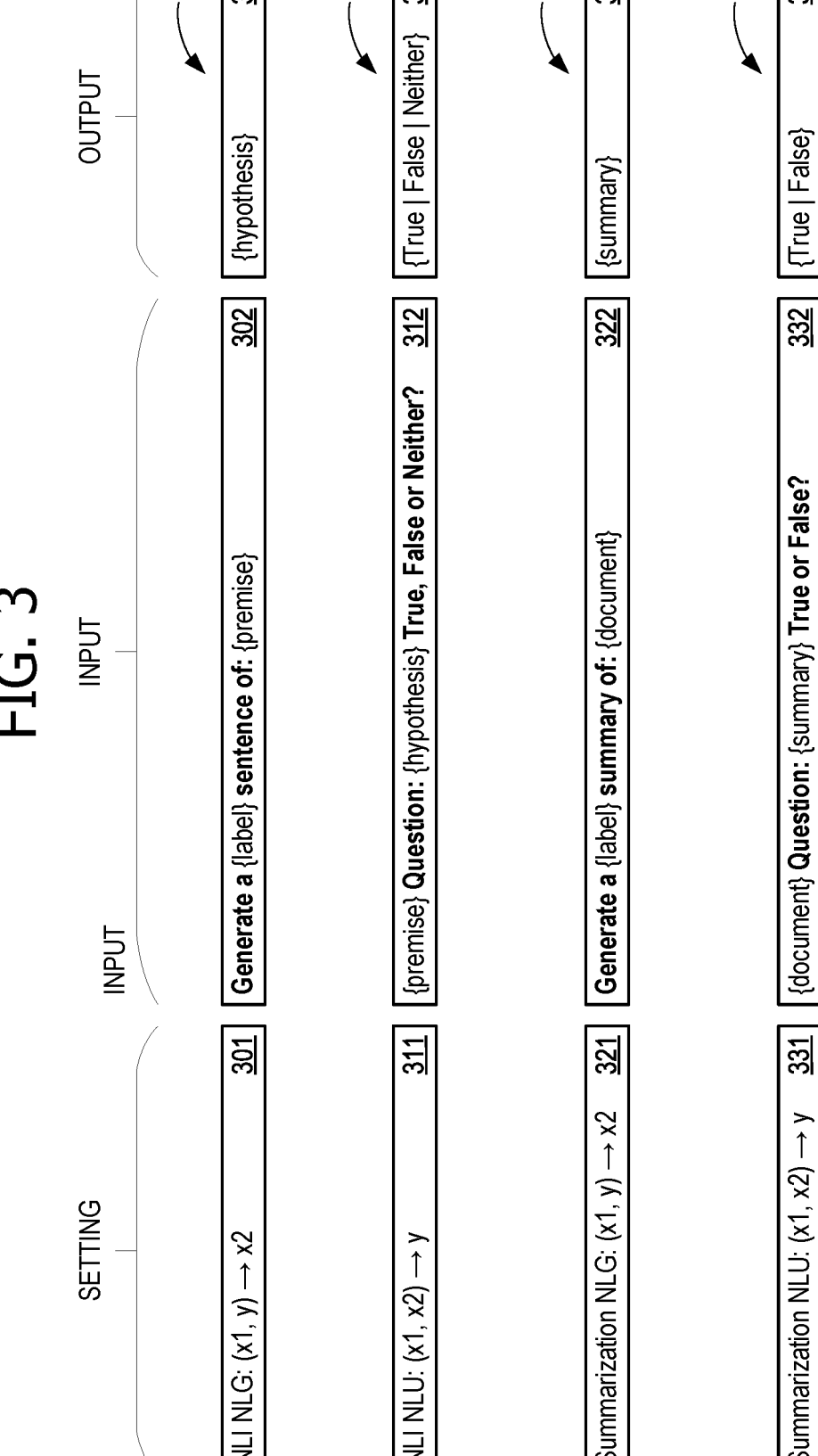
FIG. 3 illustrates generalized data and prompts for training the text-to-text model of example architectures, such as that of FIG. 1.

Generalized versions of general domain NLI NLG training case 200, general domain NLI NLU training case 210, general domain summarization NLG training case 220, and general domain summarization NLU training case 230 are shown in FIG. 3 as general domain NLI NLG training case 300, general domain NLI NLU training case 310, general domain summarization NLG training case 320, and general domain summarization NLU training case 330, respectively.

General domain NLI NLG training case 300 is denoted as a setting 301 of $(x_1,y) \rightarrow x_2$, in which $x_1$ is a premise, $x_2$ is a hypothesis, and y is a label. NLI NLG training case 300 has a general input 302 (prompt) in the form of "Generate a {label} sentence of: {premise}" and a general output 303 in the form of "{hypothesis}". General domain NLI NLU training case 310 is denoted as a setting 311 of $(x_1,x_2) \rightarrow y$, in which $x_1$ is a premise, $x_2$ is a hypothesis, and y is a label taking the form of one of {entailed, neutral, contradictory}. NLI NLU training case 310 has a general input 312 in the form of "{premise} Question: {hypothesis} True, False or Neither?" and a general output 323 in the form of "{True-|False|Neither}".

General domain summarization NLG training case 320 is denoted as a setting 321 of $(x_1,y) \rightarrow x_2$, where $x_1$ is a document, $x_2$ is a summary, and y is a label. General domain summarization NLG training case 320 has a general input 322 in the form of "Generate a {label} summary of {document}" and a general output 333 in the form of "{summary}". General domain summarization NLU training case 330 is denoted as a setting 331 of $(x_1,x_2) \rightarrow y$, where $x_1$ is a document, $x_2$ is a summary, and y is a label taking the form of one of {entailed, contradictory}. Summarization NLU training case 330 has a general input 332 in the form of "{document} Question: {summary} True or False?" and a general output 333 in the form of "{True|False}". Thus, in architecture 100, the training input text comprises a premise, hypothesis, document, or summary, and the training target output comprises a hypothesis, summary, or an indication of true, false, or neither.

The combination of NLG and NLU, NLGU, turns each task into two formulations: NLG, for label-to-data generation, and NLU, for data-to-label prediction. NLU enables zero-shot label prediction and forces text-to-text model 130 to be more sensitive to the conditioned label, assisting NLG. Meanwhile, NLG enables downstream tasks such as summarization or data augmentation. This enables text-to-text model 130 to generate its own NLI in-domain task data to use for self-fine tuning, or to generate positive and negative examples for improving text embeddings by contrastive learning.

In general, all of in-domain, MLM, NLGU, self-fine tuning of text-to-text model 130 contribute to transfer success, while in-domain MLM contributes significantly to combining domain and task knowledge. In general, scaling up the size of text-to-text model 130 improves transfer performance. Text-to-text model 130 is able to solve challenging domain-specific task examples, indicating that it acquires domain-specific task knowledge through compositional transfer.

To achieve compositional transfer, domain knowledge and task knowledge are acquired via continual pre-training. In an example, a joint loss function, $\mathcal{L}_{joint}$, is optimized that comprises an in-domain MLM loss, $\mathcal{L}_{in\text{-}domain\ MLM}$, and a general-domain task-specific loss, $\mathcal{L}_{task}$, such as:

$$\mathcal{L}_{joint} = \mathcal{L}_{in\text{-}domain\ MLM} + \mathcal{L}_{task} \qquad \text{Eq. (1)}$$

Text-to-text model 130 has an encoder-decoder generative language framework that learns a conditional sequence generator P(output|input). Text-to-text model 130 is selected to have a strong transfer learning model, and to be able to unify classification and generation. This has potential to further boost transfer performance. A cross-entropy loss with teacher-forcing is used as the pre-training objective. When text-to-text model 130 has been continually pre-trained, it can be used to perform zero-shot domain transfer on a task.

For $\mathcal{L}_{in\text{-}domain\ MLM}$, the MLM loss is used to continually pre-train a text-to-text model 130 on in-domain free text: Given a piece of sampled in-domain text (e.g., radiology or biomedical text), 15% of the tokens are randomly masked, and text-to-text model 130 is prompted complete the masked input sequence (generating the masked tokens).

For $\mathcal{L}_{task}$, $(x_1, x_2)$ is defined as a text pair that denotes (premise, hypothesis) for NLI, and (document, summary) for summarization. The standard NLI task assigns labels from y: {entailment, neutral, contradiction}, and the task is $(x_1, x_2) \rightarrow y$. For summarization, the task is usually cast as $x_1 \rightarrow x_2$. A multi-task learning strategy is adopted to train summarization and NLI simultaneously. The basic setup of task learning is NLI as a discriminative NLU task plus summarization as an NLG task.

NLGU is simultaneous (e.g., contemporaneous) NLG and NLU, formed under the hypothesis that performing NLG and NLU simultaneously will mutually benefit each other. For NLI, label-to-data NLG is added to generate pseudo in-domain text for data augmentation, performing $(x_1, y) \rightarrow x_2$ (the label y is used as control code). For summarization, an NLU task is added that predicts whether a document summary pair is entailed (the correct match) or contradictory (a counterfactual summary). The NLU component aims to improve the factuality of generated text and essentially forces the model to perform reasoning while doing generation. With NLGU, both summarization and NLI into $(x_1, x_2) \rightarrow y$ for NLU and $(x_1, y) \rightarrow x_2$ for NLG are unified. The conditional generator simultaneously optimizes two losses, such as:

$$\mathcal{L}_{task} = \mathcal{L}_{(x1, x2) \rightarrow y} + \mathcal{L}_{(x1, y) \rightarrow x2} \qquad \text{Eq. (2)}$$

NLU and NLG are both trained with sequence-to-sequence generation, and generally differ only in the input prompt and the expected output, as shown in FIG. 3. The prompts for summarization are similar to those for NLI, where premise and hypothesis are replaced with document and summary respectively. However, {entailment, contradiction} relations are defined for summarization.

After continual pre-training, text-to-text model 130 is zero-shot-transferred to three applications in specialized domains without requiring labels from the domains: (1) NLI, (2) summarization, and (3) text embedding learning. While text-to-text model 130 is capable of directly performing NLI after training on general-domain NLI task labels with $(x_1, x_2) \rightarrow y$, an additional step of self-fine tuning is performed, in some examples, to boost transfer performance.

The already-available NLG capabilities of text-to-text model 130 are leveraged to generate pseudo in-domain NLI data. A set of sentences from the target domain is sampled as premises, and text-to-text model 130 is prompted to generate hypotheses (the NLG task) with each of the three control codes (labels). This pseudo-in-domain NLI dataset is then used as additional training data to fine-tune text-to-text model 130 to perform the NLU task $(x_1, x_2) \rightarrow y$. The resulting fine-tuned model is then used for zero-shot NLI transfer.

For text summarization, text-to-text model 130 is directly prompted after continual pre-training to summarize in-domain documents. The same prompt as was used in pre-training is used: "Generate an entailed summary of: {document}". The output summary is then compared against the gold summary. Since this is already a task of text generation, i.e., $(x_1, y) \rightarrow x_2$, self-fine tuning is not available. In general, an ML model cannot improve from training on the model's own generated pseudo data.

Text-to-text model 130 may also be used as a generator for data augmentation. Apart from creating more pseudo NLI task data to improve NLI, text-to-text model 130 is able to improve domain-specific embedding learning in general. To accomplish this, a set of in-domain sentences is sampled as anchors, and text-to-text model 130 is prompted to generate entailed and contradictory sentences to form positive and negative pairs for each anchor. In some examples, with a beam search size of five, the top-k most probable sequences are sampled as the entailed (positives) and contradictory (negatives) sentences of the anchor.

Given the collected anchors and positive/negative sentences, a sentence embedding model is fine-tuned with a contrastive loss. Specifically, the sentence embedding model is continually fine-tuned and modified to handle multiple positives. The learned embedding space is then used for query-document retrieval or for computing text similarity.

Figure 4:
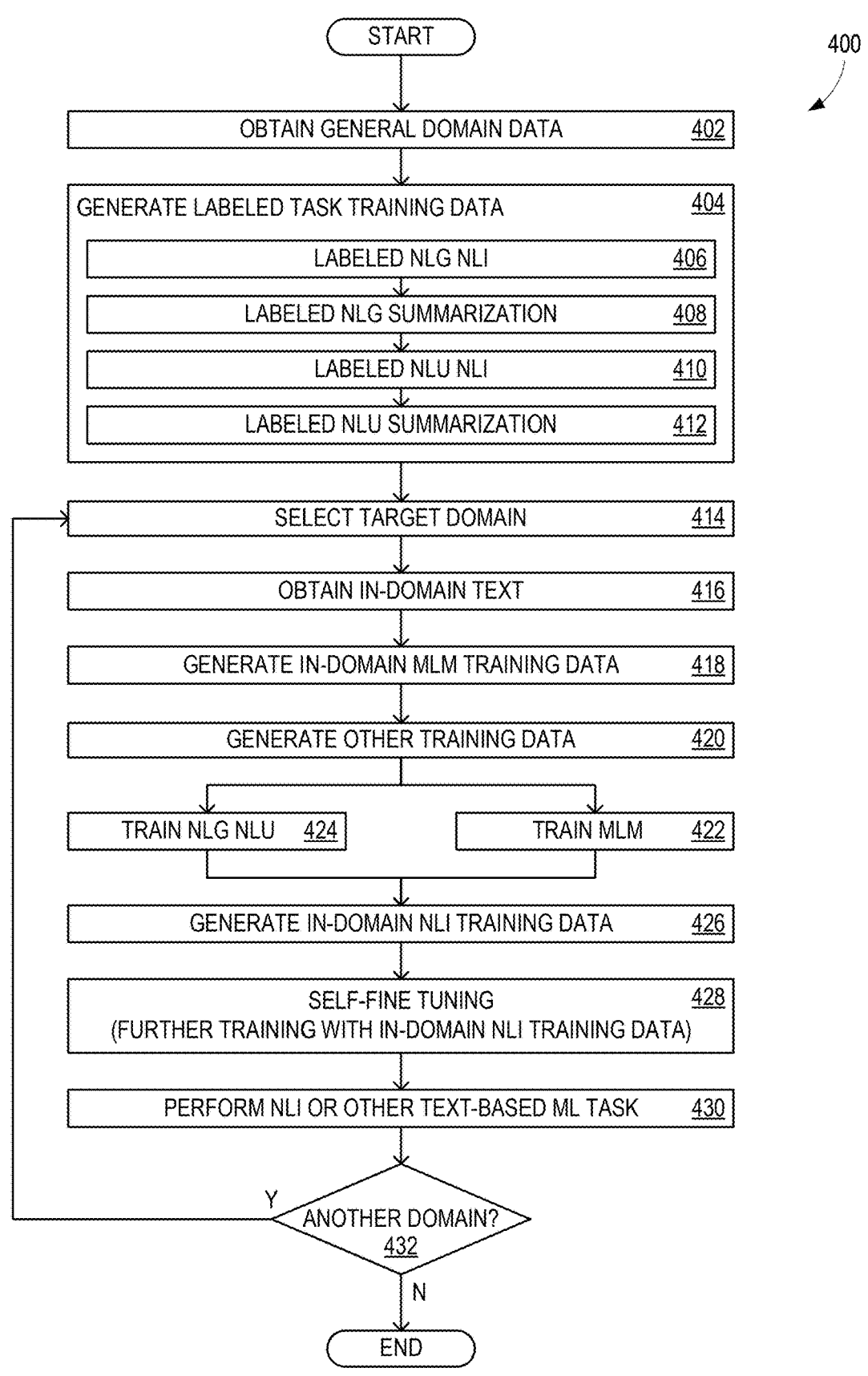
FIG. 4 shows a flowchart illustrating exemplary operations that may be performed when using example architectures, such as that of FIG. 1.

FIG. 4 shows a flowchart 400 illustrating exemplary operations that may be performed by architecture 100. In some examples, operations described for flowchart 400 are performed by computing device 600 of FIG. 6. Flowchart 400 commences with obtaining general domain data 101 for training, in operation 402.

Operation 404 generates or selects (if it already exists) labeled task training data 110a, and is performed using operations 406-412. Labeled task training data 110a is general domain data and includes labeled NLI NLG training data 106 (operation 406), labeled NLI NLU training data 107 (operation 408), labeled summarization NLG training data 108 (operation 410), and labeled summarization NLU training data (operation 412). In some examples, labeled task training data 110a comprises an indication of a training task to perform, a training input text, and a training target output. In some examples, the training task to perform is to generate text or answer a question; the training input text comprises a premise, hypothesis, document, or summary; and the training target output comprises a hypothesis, summary, or an indication of true, false, or neither.

The target domain is selected in operation 414. In some examples, the target domain comprises a domain selected from the list including: medical, radiology, biomedical, law, finance, mathematics, chemistry physics, engineering, and/ or customer service. In-domain text 111 is obtained in operation 416. Operation 418 generates in-domain MLM training data 114 and operation 420 generates other in-domain semantic training data, such as synonym pairs.

In operation 422, trainer 120 trains the text-to-text model 130 for the target domain using in-domain text 111, specifically by performing MLM training using unlabeled, in-domain MLM training data 114 that was extracted from in-domain text 111. In operation 424, which occurs simultaneously (e.g., concurrently) with operation 422, in some examples, trainer 120 trains text-to-text model 130 using labeled task training data 110a, specifically by performing both NLG training and NLU training. The NLG and NLU training each comprises both NLI training and summarization training In operation 426, text-to-text model 130 generates in-domain NLI training data 122. In operation 428, trainer 120 further trains text-to-text model 130 with in-domain NLI training data 122. Trained text-to-text model 130 performs language task 140 within the target domain, in operation 430. In some examples, language task 140 comprises a task selected from the list including: summarization, data augmentation, generating target domain training data for an ML model different than the model, document retrieval, classification, determining text similarity, and/or synthetic data generation.

Decision operation 432 determines whether architecture will be leveraged for another text-to-text model 130 for another target domain. If so, flowchart 400 returns to operation 414 to select a new target domain. Labeled task training data 110*a* may be reused, since it is domain agnostic.

FIG. 5 shows a flowchart 500 illustrating exemplary operations that may be performed using examples of architecture 100. In some examples, operations described for flowchart 500 are performed by computing device 600 of FIG. 6. Flowchart 500 commences with operation 502, which includes training a text-to-text model for a target domain using in-domain text, wherein training the model using in-domain text comprises performing MLM training.

Operation 504 includes further training the model using labeled task training data, wherein training the model using labeled task training data comprises performing both NLG training and NLU training. The NLG training comprises NLI training and the NLU training comprises summarization training. Operation 506 includes using the trained model to perform a language task within the target domain.

ADDITIONAL EXAMPLES

An example system comprises: a processor; and a computer storage medium storing instructions that are operative upon execution by the processor to: train a text-to-text model for a target domain using in-domain text, wherein training the model using in-domain text comprises performing MLM training; further train the model using labeled task training data, wherein training the model using labeled task training data comprises performing both NLG training and NLU training; and use the trained model to perform an NL) task within the target domain.

An example computerized method comprises: training a text-to-text model for a target domain using in-domain text, wherein training the model using in-domain text comprises performing MLM training; concurrently training the model using labeled task training data, wherein training the model using labeled task training data comprises performing both NLG training and NLU training; and using the trained model to perform a language task within the target domain.

One or more example computer storage devices have computer-executable instructions stored thereon, which, on execution by a computer, cause the computer to perform operations comprising: training a text-to-text model for a target domain using unlabeled in-domain text, wherein training the model using in-domain text comprises performing MLM training; concurrently training the model using labeled general domain task training data, wherein training the model using labeled task training data comprises performing both NLG training and NLU training; and using the trained model to perform a language task within the target domain.

Alternatively, or in addition to the other examples described herein, examples include any combination of the following:

- the labeled task training data comprises general domain data;
- the in-domain text comprises unlabeled in-domain text;
- the NLG training comprises NLI training and summarization training;
- the NLU training comprises NLI training and summarization training;
- generating, with the model, in-domain NLI training data;
- further training the model with the in-domain NLI training data;

- the target domain comprises a domain selected from the list consisting of: medical, radiology, biomedical, law, finance, mathematics, chemistry physics, and engineering;
- the language task comprises a task selected from the list consisting of: summarization, data augmentation, generating target domain training data for an ML model different than the model, document retrieval, classification, determining text similarity, and synthetic data generation;
- training the model using in-domain text is concurrent with training the model using labeled task training data;
- the labeled task training data comprises an indication of a training task to perform, a training input text, and a training target output;
- the training task to perform is to generate text or answer a question;
- the model comprises a T5 model;
- the training input text comprises a premise, hypothesis, document, or summary; and
- the training target output comprises a hypothesis, summary, or an indication of true, false, or neither.

While the aspects of the disclosure have been described in terms of various examples with their associated operations, a person skilled in the art would appreciate that a combination of operations from any number of different examples is also within scope of the aspects of the disclosure.

Example Operating Environment

FIG. 6 is a block diagram of an example computing device 600 (e.g., a computer storage device) for implementing aspects disclosed herein, and is designated generally as computing device 600. In some examples, one or more computing devices 600 are provided for an on-premises computing solution. In some examples, one or more computing devices 600 are provided as a cloud computing solution. In some examples, a combination of on-premises and cloud computing solutions are used. Computing device 600 is but one example of a suitable computing environment and is not intended to suggest any limitation as to the scope of use or functionality of the examples disclosed herein, whether used singly or as part of a larger set.

Neither should computing device 600 be interpreted as having any dependency or requirement relating to any one or combination of components/modules illustrated. The examples disclosed herein may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implement particular abstract data types. The disclosed examples may be practiced in a variety of system configurations, including personal computers, laptops, smart phones, mobile tablets, hand-held devices, consumer electronics, specialty computing devices, etc. The disclosed examples may also be practiced in distributed computing environments when tasks are performed by remote-processing devices that are linked through a communications network.

Computing device 600 includes a bus 610 that directly or indirectly couples the following devices: computer storage memory 612 (computer storage medium), one or more processors 614, one or more presentation components 616, input/output (I/O) ports 618, I/O components 620, a power supply 622, and a network component 624. While computing device 600 is depicted as a seemingly single device, multiple computing devices 600 may work together and share the depicted device resources. For example, memory 612 may be distributed across multiple devices, and processor(s) 614 may be housed with different devices.

Bus 610 represents what may be one or more busses (such as an address bus, data bus, or a combination thereof). Although the various blocks of FIG. 6 are shown with lines for the sake of clarity, delineating various components may be accomplished with alternative representations. For example, a presentation component such as a display device is an I/O component in some examples, and some examples of processors have their own memory. Distinction is not made between such categories as "workstation," "server," "laptop," "hand-held device," etc., as all are contemplated within the scope of FIG. 6 and the references herein to a "computing device." Memory 612 may take the form of the computer storage media referenced below and operatively provide storage of computer-readable instructions, data structures, program modules and other data for the computing device 600. In some examples, memory 612 stores one or more of an operating system, a universal application platform, or other program modules and program data. Memory 612 is thus able to store and access data 612 *a* and instructions 612 *b* that are executable by processor 614 and configured to carry out the various operations disclosed herein.

In some examples, memory 612 includes computer storage media. Memory 612 may include any quantity of memory associated with or accessible by the computing device 600. Memory 612 may be internal to the computing device 600 (as shown in FIG. 6), external to the computing device 600 (not shown), or both (not shown). Additionally, or alternatively, the memory 612 may be distributed across multiple computing devices 600, for example, in a virtualized environment in which instruction processing is carried out on multiple computing devices 600. For the purposes of this disclosure, "computer storage media," "computer-storage memory," "memory," and "memory devices" are synonymous terms for the computer-storage memory 612, and none of these terms include carrier waves or propagating signaling.

Processor(s) 614 may include any quantity of processing units that read data from various entities, such as memory 612 or I/O components 620. Specifically, processor(s) 614 are programmed to execute computer-executable instructions for implementing aspects of the disclosure. The instructions may be performed by the processor, by multiple processors within the computing device 600, or by a processor external to the client computing device 600. In some examples, the processor(s) 614 are programmed to execute instructions such as those illustrated in the flow charts discussed below and depicted in the accompanying drawings. Moreover, in some examples, the processor(s) 614 represent an implementation of analog techniques to perform the operations described herein. For example, the operations may be performed by an analog client computing device 600 and/or a digital client computing device 600. Presentation component(s) 616 present data indications to a user or other device. Exemplary presentation components include a display device, speaker, printing component, vibrating component, etc. One skilled in the art will understand and appreciate that computer data may be presented in a number of ways, such as visually in a graphical user interface (GUI), audibly through speakers, wirelessly between computing devices 600, across a wired connection, or in other ways. I/O ports 618 allow computing device 600 to be logically coupled to other devices including I/O components 620, some of which may be built in. Example I/O components 620 include, for example but without limitation, a microphone, joystick, game pad, satellite dish, scanner, printer, wireless device, etc.

Computing device 600 may operate in a networked environment via the network component 624 using logical connections to one or more remote computers. In some examples, the network component 624 includes a network interface card and/or computer-executable instructions (e.g., a driver) for operating the network interface card. Communication between the computing device 600 and other devices may occur using any protocol or mechanism over any wired or wireless connection. In some examples, network component 624 is operable to communicate data over public, private, or hybrid (public and private) using a transfer protocol, between devices wirelessly using short range communication technologies (e.g., near-field communication (NFC), Bluetooth™ branded communications, or the like), or a combination thereof. Network component 624 communicates over wireless communication link 626 and/or a wired communication link 626 *a* to a remote resource 628 (e.g., a cloud resource) across network 630. Various different examples of communication links 626 and 626 *a* include a wireless connection, a wired connection, and/or a dedicated link, and in some examples, at least a portion is routed through the internet.

Although described in connection with an example computing device 1500, examples of the disclosure are capable of implementation with numerous other general-purpose or special-purpose computing system environments, configurations, or devices. Examples of well-known computing systems, environments, and/or configurations that may be suitable for use with aspects of the disclosure include, but are not limited to, smart phones, mobile tablets, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, virtual reality (VR) devices, augmented reality (AR) devices, mixed reality devices, holographic device, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein. In examples involving a general-purpose computer, aspects of the disclosure transform the general-purpose computer into a special-purpose computing device when configured to execute the instructions described herein.

By way of example and not limitation, computer readable media comprise computer storage media and communication media. Computer storage media include volatile and nonvolatile, removable and non-removable memory implemented in any method or technology for storage of information such as computer readable instructions, data structures, program modules, or the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, solid-state memory, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that may be used to store information for access by a computing device. In contrast, communication media typically embody computer readable instructions, data structures, program modules, or the like in a modulated data signal such as a carrier wave or other transport mechanism and include any information delivery media.

The order of execution or performance of the operations in examples of the disclosure illustrated and described herein is not essential, and may be performed in different sequential manners in various examples. For example, it is contemplated that executing or performing a particular operation before, contemporaneously with, or after another operation is within the scope of aspects of the disclosure. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system comprising:
a processor; and
a computer storage medium storing instructions that are operative upon execution by the processor to:

14 train a text-to-text model for a specialized target domain, training material for the specialized target domain being limited to a particular subject matter, wherein:
the text-to-text model has an encoder-decoder generative language framework; and
the training comprises simultaneously performing:
masked language modeling (MLM) training using unlabeled text from the specialized target domain, wherein the text-to-text model acquires domain-specific knowledge;
task training using labeled task training data, resulting in the text-to-text model acquiring transferable task knowledge, wherein the task training comprises:
natural language generation (NLG) training, including natural language inference (NLI) generation tasks; and
natural language understanding (NLU) training, including summarization classification tasks; and
the MLM training and the task training collectively cause the text-to-text model to acquire domain-specific task competency; and
use the trained text-to-text model to perform a language task within the specialized target domain.

2. The system of claim 1, wherein the labeled task training data comprises general domain data.

3. The system of claim 1, wherein the NLI generation tasks comprise summarization.

4. The system of claim 1, wherein the instructions are further operative to:
generate, with the text-to-text model, additional NLI training data in the specialized target domain; and
further train the text-to-text model with the additional NLI training data.

5. The system of claim 1, wherein the specialized target domain comprises a knowledge domain selected from a list consisting of: medical, radiology, biomedical, law, finance, mathematics, chemistry physics, and engineering.

6. The system of claim 1, wherein the task training comprises a task selected from a list consisting of: summarization, data augmentation, generating target domain training data for a machine learning (ML) model different than the text-to-text model, document retrieval, classification, determining text similarity, and synthetic data generation.

7. The system of claim 1, wherein the training task comprises a task to generate text or answer a question.

8. A computerized method comprising:
training a text-to-text model for a specialized target domain, training material for the specialized target domain being limited to a particular subject matter, wherein:
the text-to-text model has an encoder-decoder generative language framework; and
the training comprises simultaneously performing:
masked language modeling (MLM) training using unlabeled text from the specialized target domain, wherein the text-to-text model acquires domain-specific knowledge;
task training using labeled task training data, resulting in the text-to-text model acquiring transferrable task knowledge, wherein the task training comprises:
natural language generation (NLG) training, including natural language inference (NLI) generation tasks; and natural language understanding (NLU) training, including summarization classification tasks; and the MLM training and the task training collectively cause the text-to-text model to acquire domain-specific task competency; and using the trained text-to-text model to perform a language task within the specialized target domain.

9. The method of claim 8, wherein the labeled task training data comprises general domain data.

10. The method of claim 8, wherein the NLI generation tasks comprise summarization.

11. The method of claim 8, further comprising:

generating, with the text-to-text model, additional NLI training data in the specialized target domain; and further training the text-to-text model with the additional NLI training data.

12. The method of claim 8, wherein the specialized target domain comprises a knowledge domain selected from a list consisting of: medical, radiology, biomedical, law, finance, mathematics, chemistry physics, and engineering.

13. The method of claim 8, wherein the task training comprises a task selected from a list consisting of: summarization, data augmentation, generating target domain training data for a machine learning (ML) model different than the text-to-text model, document retrieval, classification, determining text similarity, and synthetic data generation.

14. The method of claim 8, wherein the text-to-text model comprises a text-to-text transfer transformer (T5) model.

15. A computer storage device having computer-executable instructions stored thereon, which, on execution by a computer, cause the computer to perform operations comprising:

training a text-to-text model for a specialized target domain, training material for the specialized target domain being limited to a particular subject matter, wherein:

the text-to-text model has an encoder-decoder generative language framework; and the training comprising simultaneously performing:

masked language modeling (MLM) training using unlabeled text from the specialized target domain, wherein the text-to-text model acquires domain-specific knowledge;

task training using labeled task training data that is not limited to a particular subject matter, wherein the task training comprises natural language generation (NLG) training, including natural language inference (NLI) generation tasks; and natural language understanding (NLU) training, including summarization classification tasks; and the MLM training and the task training collectively cause the text-to-text model to acquire domain-specific task competency; and using the trained text-to-text model to perform a language task within the target domain.

16. The computer storage device of claim 15, wherein the NLI generation tasks comprise summarization.

17. The computer storage device of claim 15, wherein the operations further comprise:

generating, with the text-to-text model, additional NLI training data in the specialized target domain; and further training the text-to-text model with the additional NLI training data.

18. The computer storage device of claim 15, wherein the specialized target domain comprises a knowledge domain selected from a list consisting of: medical, radiology, biomedical, law, finance, mathematics, chemistry physics, and engineering.

19. The computer storage device of claim 15, wherein the task training comprises a task selected from a list consisting of: summarization, data augmentation, generating target domain training data for a machine learning (ML) model different than the text-to-text model, document retrieval, classification, determining text similarity, and synthetic data generation.

20. The computer storage device of claim 15, wherein the labeled task training data comprises an indication of a training task to perform, a training input text, and a training target output.

* * * * *